(12) United States Patent
Stilleke et al.

(10) Patent No.: US 9,114,737 B2
(45) Date of Patent: Aug. 25, 2015

(54) FITTING FOR A VEHICLE SEAT AND METHOD FOR PRODUCING SAME

(75) Inventors: Martin Stilleke, Recklinghausen (DE); Jonni Musian, Kaiserslautern (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 76 days.

(21) Appl. No.: 13/983,765

(22) PCT Filed: Feb. 9, 2012

(86) PCT No.: PCT/EP2012/000583
§ 371 (c)(1),
(2), (4) Date: Oct. 16, 2013

(87) PCT Pub. No.: WO2012/110213
PCT Pub. Date: Aug. 23, 2012

(65) Prior Publication Data
US 2014/0145491 A1    May 29, 2014

(30) Foreign Application Priority Data
Feb. 14, 2011    (DE) .......................... 10 2011 012 076

(51) Int. Cl.
*B60N 2/02*    (2006.01)
*B60N 2/225*    (2006.01)
*B21K 23/00*    (2006.01)

(52) U.S. Cl.
CPC ............... *B60N 2/225* (2013.01); *B21K 23/00* (2013.01); *B60N 2/2252* (2013.01); *B60N 2/2254* (2013.01)

(58) Field of Classification Search
CPC ....... B60N 2/2356; B60N 2/2352; B60N 2/20
USPC ............................................ 297/367 R, 361.1
See application file for complete search history.

(56) References Cited

U.S. PATENT DOCUMENTS 5,295,390 A * 3/1994 Hosono ............................ 72/334
6,619,743 B1 * 9/2003 Scholz et al. .................. 297/362
(Continued)

FOREIGN PATENT DOCUMENTS

DE    4436101 A1    6/1995
DE    19548809 C1    5/1997
(Continued)

OTHER PUBLICATIONS

International Preliminary Report on Patentability mailed Aug. 29, 2013, as received in corresponding International Patent Application No. PCT/EP2012/000583.
(Continued)

*Primary Examiner* — Laurie Cranmer
(74) *Attorney, Agent, or Firm* — Foley & Lardner LLP

(57) ABSTRACT

A fitting for a vehicle seat, in particular for a motor vehicle seat, includes a first fitting part and a second fitting part, which are rotatable relative to one another and which are in geared connection with one another by a ring gear and a gear wheel which meshes with the ring gear. The fitting also includes a cam which is driven by a driver and revolves in the circumferential direction in order to drive a relative rolling movement of the gear wheel and the ring gear. The driver is mounted with a clearance and/or the cam is mounted on a collar of the second fitting part. The collar has a flange on the free end thereof. The end face of the flange forms an axial support surface for the driver. The flange includes a groove in the support surface.

15 Claims, 3 Drawing Sheets

(56) References Cited

U.S. PATENT DOCUMENTS

Figure 4:
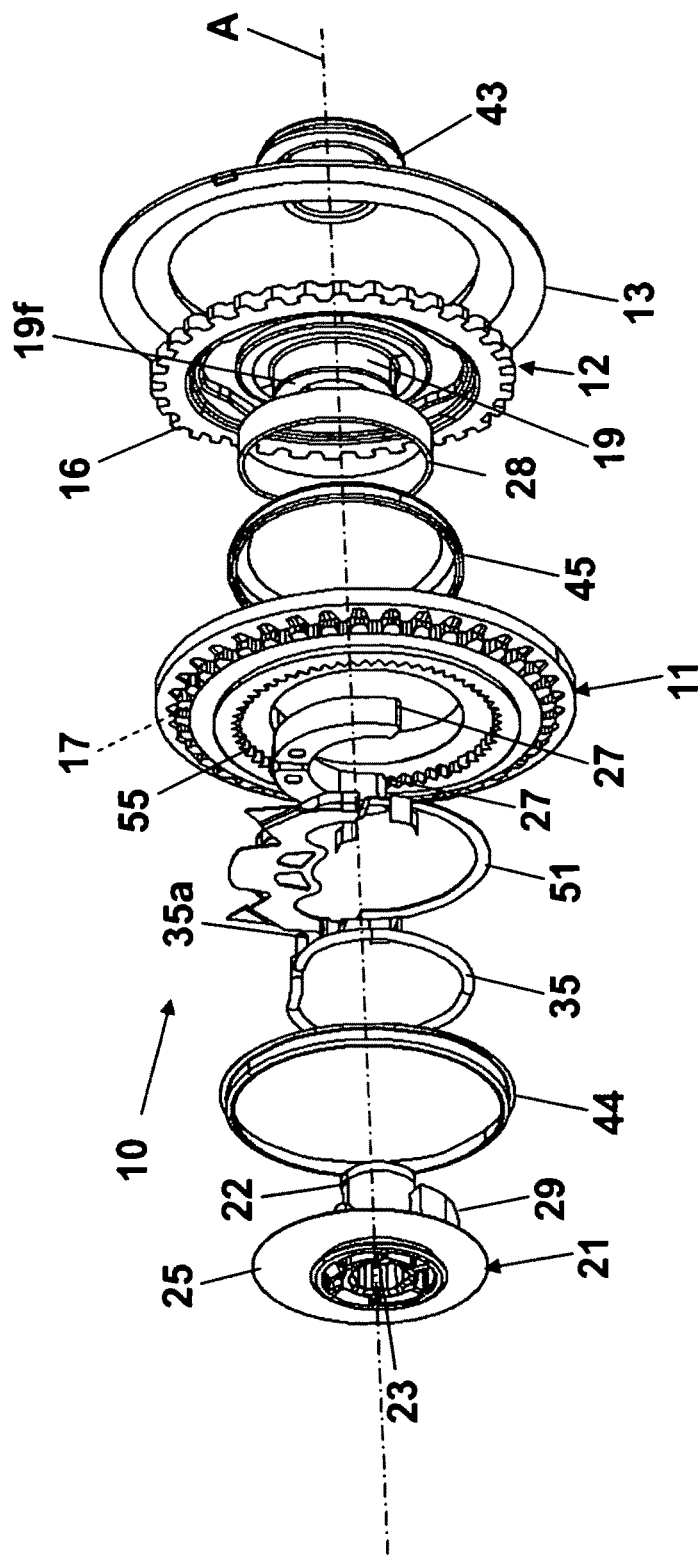

| | | | |
|---|---|---|---|
| 6,799,806 B2 | 10/2004 | Eppert et al. | |
| 2005/0231015 A1 | 10/2005 | Wilkening | |
| 2011/0138940 A1* | 6/2011 | Krueger et al. | 74/60 |

FOREIGN PATENT DOCUMENTS

| | | |
|---|---|---|
| DE | 101 07 109 A1 | 10/2002 |
| DE | 1020040 15 977 A1 | 10/2005 |
| DE | 2020100 12 621 U1 | 1/2011 |
| JP | 04-033728 | 2/1992 |
| JP | 2005-280702 | 10/2005 |

OTHER PUBLICATIONS

Office Action dated Jul. 1, 2014, in Japanese Patent Application No. 2013-538241 and English translation, 4 pages.

International Search Report in PCT/EP2012/000583 dated Oct. 26, 2012.

* cited by examiner

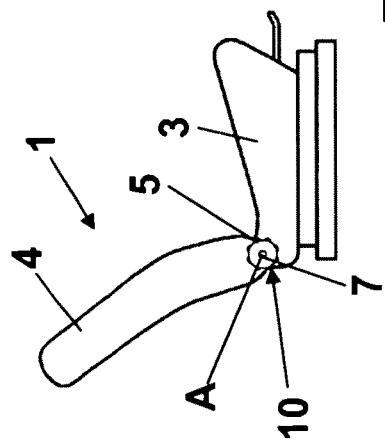
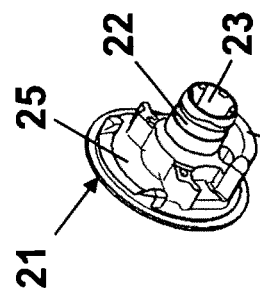
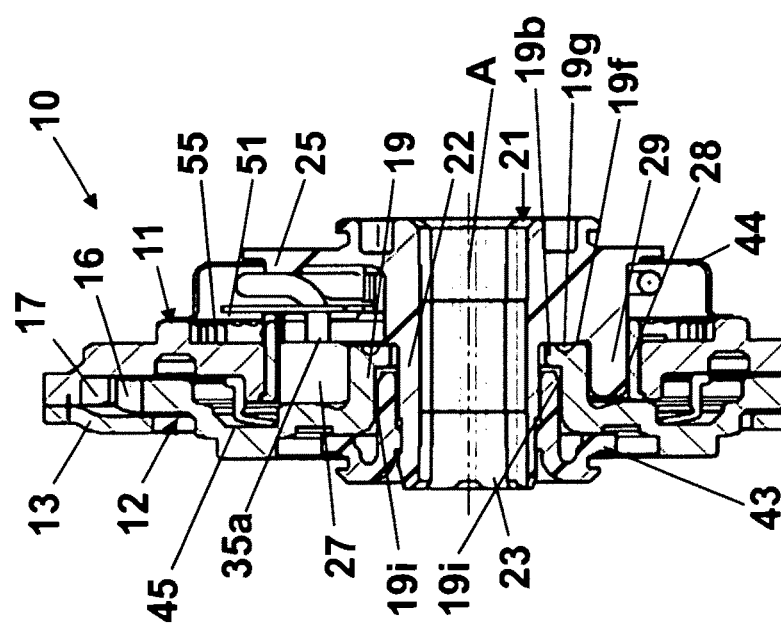

FITTING FOR A VEHICLE SEAT AND METHOD FOR PRODUCING SAME

CROSS REFERENCE TO RELATED APPLICATIONS

The present application is a National Stage of International Application No. PCT/EP2012/000583 filed on Feb. 9, 2012, which claims the benefit of German Patent Application No. 10 2011 012 076.9 filed on Feb. 14, 2011, the entire disclosures of which are incorporated herein by reference.

The invention relates to a fitting for a vehicle seat with the features of the preamble of claim 1 and to a method for producing same with the features of the Hpreamble of claim 13.

A fitting of this type is known from DE 20 2010 012 621 U1. The eccentric which has two wedge segments is supported on a collar of the second fitting part. The driver which drives the eccentric is mounted in the collar by means of a hub and is supported axially on the end surface of the collar. The collar end surface which is in the form of a supporting surface is shown to be larger than the wall thickness of the collar in FIG. 4 of DE 20 2010 012 621 U1. However, it has been shown in practice that a sufficiently large supporting surface cannot be produced to satisfactory quality using known methods for collar drawing. The supporting surface becomes creased and a material tapering is produced in the edge region of the supporting surface, and therefore the driver cannot be adequately supported and does not bear in a planar manner on the supporting surface.

DE 101 07 109 A1 discloses a method for closing the impact opening in rolled bearing bushings having a flange facing radially outward. The introduction of depressions running in the radial direction into the flange of said bearing bushings displaces material in the circumferential direction such that the impact opening is closed. The method for rolling a bearing bushing is not related in terms of production to the collar drawing and is not transferrable thereto. In addition, the displacement of material in the circumferential direction of the flange would lead in the case of collar formations to further creasing in the end surface.

It is known from DE 10 2004 015 977 A1 to stamp a bevel onto the outer and/or inner edge of the flange surfaces of rolled plain bearing bushings. It is disadvantageous that, due to the bevels the flange surface, material is displaced from the radially outer region and the supporting surface is reduced as a result.

The invention is based on the object of improving a fitting of the type mentioned at the beginning, in particular of optimizing the quality of the supporting surface without reducing the inside diameter of the supporting surface. This object is achieved according to the invention by a fitting with the features of claim 1. Advantageous refinements are the subject matter of the dependent claims.

For a large supporting surface, the collar has a flange which, after the drawing of the collar, is formed by deforming the free end of the collar with a radial displacement of the material, optionally additionally with axial compression. In order to improve the radial displacement of the material, a groove is formed within the supporting surface. The material which is displaced because of the formation of the groove reinforces the flange, i.e. the radially protruding region, and improves the back filling of the material at the "corner" of the collar, i.e. at the radially outer edge of the end side. In order to form the groove, the corresponding tool has a bead. At least sections of the bead run in the circumferential direction, and therefore the groove is in the form of an impression of the bead within the supporting surface, i.e. in the material of the collar in the region of the flange. A potential overlapping of the material during the calibrating of the collar is avoided by the use of the bead.

The groove preferably has a depth of 0.5 mm+/−0.2 mm. This depth has proven sufficient for collar formations of fittings in order to displace material sufficiently into the desired regions without producing excessive stresses in the supporting surface.

It is particularly advantageous for the production of flat supporting surfaces of fittings if the groove is placed in the supporting surface closer to the inner edge than to the outer edge of the supporting surface.

The invention is preferably usable for adjusting the inclination of the backrest of vehicle seats in motor vehicles, but may also be used for other purposes.

Figure 7:
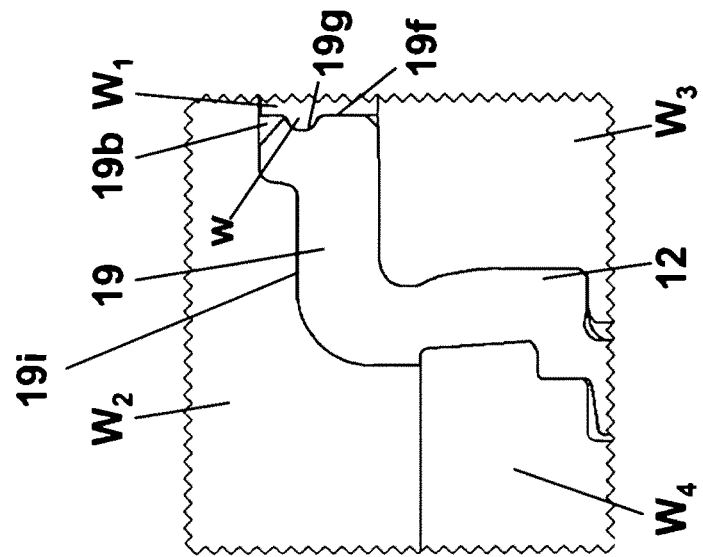
Figure 6:
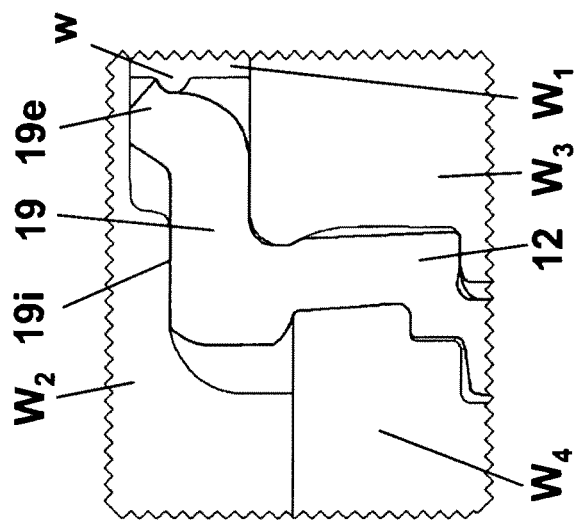
Figure 5:
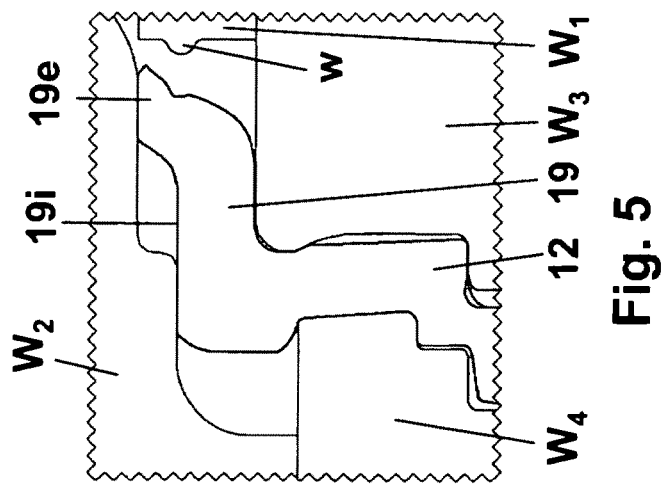

The invention is explained in more detail below with reference to an exemplary embodiment which is illustrated in the drawing and has a modification. In the drawing FIG. 1 shows an axial section through the fitting,
FIG. 2 shows a perspective view of the driver,
FIG. 3 shows a schematic illustration of a vehicle seat,
FIG. 4 shows an exploded illustration of the fitting,
FIG. 5 shows an enlarged detail of FIG. 4 after the drawing of the collar and before the formation of the flange,
FIG. 6 shows an enlarged detail of FIG. 4 during the formation of the flange, and
FIG. 7 shows an enlarged detail of FIG. 4 after the formation of the flange.

A vehicle seat 1 for a motor vehicle has a seat part 3 and a backrest 4, the inclination of which is adjustable relative to the seat part 3. For the inclination adjustment of the backrest 4, a drive shaft 7, which is arranged horizontally in the transition region between the seat part 3 and backrest 4, is rotated manually, for example by means of a hand wheel 5, or by motor, for example by means of an electric motor. On both sides of the vehicle seat 1, the drive shaft 7 engages in respective fittings 10 for conjoint rotation. The drive shaft 7 defines an axis A and the directional details of a cylindrical coordinate system that are used below. As is customary in the case of cylindrical coordinate systems, the radial direction is perpendicular to the axis A.

The fitting 10 has a first fitting part 11 and a second fitting part 12, which are rotatable relative to each other. The two fitting parts 11 and 12 can each be approximately inscribed in a circular disk shape. The two fitting parts 11 and 12 preferably consist of metal, in particular steel, which may be hardened at least in regions. In order to absorb the axially acting forces, i.e. in order to hold the fitting parts 11 and together, a clasping ring 13 is provided. The principle of such a holding-together action by means of a clasping ring is described, for example, in U.S. Pat. No. 6,799,806 B2. The clasping ring 13 preferably consists of metal, in particular steel, which is preferably unhardened. The clasping ring 13 preferably has a substantially flat ring shape.

The clasping ring 13 is fixedly connected to one of the two fitting parts 11 and 12, in the present case, for example, is welded or crimped (at least partially in the circumferential direction) in an outer edge section of the first fitting part 11. The clasping ring 13 engages by means of a radially inwardly facing edge, optionally with the interposition of a separate sliding ring which is movable relative thereto, over the other of the two fitting parts 11 and 12 radially on the outside (i.e. in the radially outer edge region thereof) without obstructing the relative rotation of the two fitting parts 11 and 12. In addition, the mutually facing inner surfaces of the two fitting parts and 12 are protected against the penetration of foreign bodies and from soiling and damage.

The clasping ring 13 and the fitting part 11 or 12 fixedly connected thereto therefore clasp the other of the two fitting parts 11 and 12 which is movable relative to them. In a structural respect, the two fitting parts 11 and 12 therefore together (with the clasping ring 13) form a disk-shaped unit.

With the installation of the fitting 10, the first fitting part 11 is, for example, connected fixedly to the structure of the backrest 4, i.e. is mounted on the backrest part. The second fitting part 12 is then connected fixedly to the structure of the seat part 3, i.e. is mounted on the seat part. Said assignments of the fitting parts 11 and 12 are preferred if the radial distances of the fastening points between the fitting and a relatively thin backrest plate as backrest side strut are intended to be as large as possible. However, the assignments of the fitting parts 11 and 12 may also be interchanged, i.e. the first fitting part would then be mounted on the seat part and the second fitting part 12 mounted on the backrest. The fitting 10 therefore lies in the force flux between the backrest 4 and the seat part 3.

The fitting 10 is designed as a geared fitting, in which the first fitting part 11 and the second fitting part 12 are connected to each other by means of a gearing for adjustment and fixing, in more precise terms by means of an—in the present case self-locking—eccentric epicyclic gearing, as described, for example, in DE 44 36 101 A1.

In order to form the gearing, an externally toothed gear wheel 16 is formed on the second fitting part 12 and an internally toothed ring 17 is on the first fitting part 11, said gear wheel and toothed ring meshing with each other. The diameter of the addendum circle of the external toothing of the gear wheel 16 is smaller by at least one tooth height than the diameter of the dedendum circle of the internal toothing of the toothed ring 17. A corresponding difference in the number of teeth of gear wheel 16 and toothed ring 17 of at least one tooth permits a rolling movement of the toothed ring 17 on the gear wheel 16. The gear wheel 16 and toothed ring 17 are preferably formed by means of a single stamping and punching operation which, at the same time, punches the fitting parts 11 and 12 out of the starting material thereof. As an alternative, the fitting parts 11 and 12 may be produced—with similar geometries and identical functions—by bulk deformation (preferably cold extrusion or hot extrusion). In the present case, the gear wheel 16 forms the radially outer edge of the second fitting part 12, i.e. the second fitting part 12 ends radially on the outside with the gear wheel 16.

One of the two fitting parts 11 and 12, in the present case the second fitting part 12, has a collar 19 concentrically with respect to the gear wheel 16. The collar 19 may be integrally formed as a collar formation on said fitting part (i.e. formed as a single piece) or fastened to said fitting part as a separate sleeve. A driver 21 is mounted rotatably in the collar 19 by means of a hub 22. The driver 21 is preferably composed of plastic. The hub 22 of the driver 21 is provided centrally with a bore 23 for receiving the drive shaft 7. The profile of the bore 23 is formed so as to match the profile of the drive shaft 7, in the present case a spline. Following its hub 22, the driver 21 has a covering disk 25 which is formed as a single piece with the hub 22 and has a larger diameter than the hub 22.

Two wedge segments 27 are supported—by means of the curved inner surfaces thereof—on the collar 19, said wedge segments—by means of the curved outer surfaces thereof—carrying the other of the two fitting parts 11 and 12, in the present case the first fitting part 11. To this end, a receptacle in the last-mentioned fitting part is lined with a plain bearing bushing 28 which is pressed in preferably non-rotatably and against which the outer surfaces of the wedge segments bear. The terms "support" and "carry" are not intended to be limited to a certain direction of the force flux through the fitting 10, since said direction depends on the installation of the fitting 10.

The driver 21 has—spaced apart radially from the hub 22—a driver segment 29 which is held with play between the narrow sides of the wedge segments 27 and is formed as a single piece with the covering disk 25 and with the hub 22. The wedge segments 27, the wide sides of which face each other, each receive an angled end finger 35a of an omega-shaped spring 35, for example by means of a respective opening or by a recess defined by projecting portions of material. The spring acts upon the wedge segments 27 in the circumferential direction in particular in order to push said wedge segments apart, wherein, during operation, the wide sides of the wedge segments 27 can touch and act upon each other.

The driver 21 is axially secured on the outer side of the fitting part having the collar 19 by means of a securing ring 43, which is preferably clipped on. The securing ring 43 extends in the axial direction along part of the hub 22 such that the hub 22 does not bear directly against the inner side of the collar 19, but rather is mounted in the collar 19 with the interposition of the securing ring 43 (and, as a result, the driver 21 is mounted on the second fitting part 12).

On the outer side of the fitting part having the plain bearing bushing 28 (in the present case, the first fitting part 11), a sealing ring 44, for example made of rubber or soft plastic, is provided between the radially outer edge of said fitting part and the covering disk 25 and is connected, in particular clipped, to the covering disk 25. The sealing ring 44 can also be formed from metal and fixedly connected, for example welded, to the first fitting part 11, wherein the covering disk 25 is then movable relative to the sealing ring 44. A separating ring 45 is optionally provided within the construction space between the two fitting parts 11 and 12 as an internal seal, said separating ring being composed, for example, of plastic.

The wedge segments 27 (and the spring 35) define an eccentric which, as an extension of the direction of the eccentricity, presses the gear wheel 16 into the toothed ring 17 at an engagement point. During driving by means of the (multiply) rotating drive shaft 7, a torque is first of all transmitted to the driver 21 and, by means of the driver segment 29, is then transmitted to the eccentric, which is defined in this manner and which slides along the plain bearing bushing 28, displacing the direction of the eccentricity and therefore displacing the engagement point of the gear wheel 16 in the toothed ring 17, which is represented in the form of a wobbling rolling movement, i.e. as relative rotation with a superimposed wobbling movement. As a result, the inclination of the backrest 4 is adjustable steplessly between a plurality of use positions.

In order to improve the dynamic operating behavior, a blocking spring 51 as disclosed, for example, in DE 195 48 809 C1 is preferably also provided as a blocking element. In the present case, the blocking spring 51 interacts with a toothing 55 which is formed as a further toothed ring on the first fitting part 11. The blocking spring 51—preferably mounted movably on an axial excess length of the plain bearing bushing 28—in each case blocks the wedge segments 27 in the non-driven state (by the blocking spring 51 blocking the spring 35 by means of bearing against the end fingers 35a) and is released by the driven driver 21.

Apart from the radial carrying of the driver 21 (and securing ring 43) on the collar 19 of the second fitting part 12, an axial supporting of the driver 21 on a supporting surface 19f of the collar 19 is also provided. The collar 19 has a shape differing from a hollow cylinder, in particular because of a (radially inwardly facing) flange 19b, the end surface of which that faces in the axial direction defines the axial supporting surface 19f of the collar 19. As a result, the supporting surface 19f which projects inward radially over an inner surface 19i of the basic cylinder of the collar 19 is larger than the central cross-sectional area of the collar 19. The driver 21 has a contact surface which is matched to the supporting surface 19f and as which, in the present case, the axially facing end side of a step running around the hub 22 serves. In the region of the driver segment 29, said contact surface reaches as far as the radially inner flank of the driver segment 29.

During the production of the second fitting part 12, there is the challenge at the collar 19 to form the supporting surface 19f to be larger than the central cross-sectional area of the collar 19 and to form the flange 19b and the supporting surface 19f thereof radially inward over the cylindrical inner surface 19i of the collar 19. For this purpose, in a first step, the collar 19 is drawn, after which the free end 19e of the collar 19 is present in a (radially inwardly facing) funnel shape with a decreasing material thickness (FIG. 5). In a second step, the free end 19e of the collar 19 is then deformed (FIG. 6) by a plurality of tools $W_1$, $W_2$, $W_3$, $W_4$, i.e., in the present case, material is displaced until the flange 19b is formed (FIG. 7). In the process, the first tool $W_1$ is moved axially toward the free end 19e, the tool $W_2$ is moved from the opposite direction toward the other end of the collar 19, the third tool $W_3$ is moved slightly toward the second fitting part 12, in order also slightly to deform the latter radially outside the collar 19, and the fourth tool $W_4$ serves as a stationary holder and counterpart for the third tool $W_3$.

In order better to displace the material, the end side of the first tool $W_1$ has an annular bead w which is formed continuously or interrupted, i.e. at least in sections, in the circumferential direction. The bead w is aligned approximately with the radially inner wall (the wall placed at the top in FIG. 5) of the drawn collar 19 and leads in the direction of movement of the tool W. In the second step, the bead w therefore comes into contact, shortly before the other regions of the first tool $W_1$ that are positioned to the sides of said bead, with the material of the free end 19e of the collar 19. Upon further movement of the first tool $W_1$ when the material of the free end 19e of the collar 19 is (axially) compressed by the first tool $W_1$ in interaction with the second tool $W_2$, the bead w displaces the material, which is in contact therewith, of the free end 19e of the collar 19 transversely with respect to the direction of movement of the first tool $W_1$ (i.e. transversely with respect to the axial direction), namely outward and inward in the radial direction (for example, approximately by half in each case). In this case, a groove 19g is formed in the supporting surface 19f. Said groove 19g is produced as an impression of the bead w and at least sections of the groove run in the circumferential direction corresponding to the bead w. The displacement of the material by the bead w improves the formation of the flange 19b, in particular radially inward, wherein the flange 19b is then also definitively formed by those regions of the first tool $W_1$ which are placed to the sides of the bead w.

The continuously encircling groove 19g runs equidistantly from the inner edge of the supporting surface 19f and, in the present case, has a depth of 0.5 mm+/−0.2 mm. In principle, however, other groove depths are also possible; a greater depth is illustrated in the figures in order to illustrate the invention.

In the present case, the supporting surface 19f has an outside diameter of 21 mm+/−1 mm and an inside diameter of 13 mm+/−1 mm, wherein the groove 19g lies on a circle with a diameter of 16 mm+/−1 mm. Owing to the flange 19, the wall thickness of the collar 19 varies over the axial extent thereof. The minimum wall thickness of the collar 19 is 2.7 mm+/−0.5 mm.

LIST OF DESIGNATIONS

1 Vehicle seat
3 Seat part
4 Backrest
5 Hand wheel
7 Drive shaft
10 Fitting
11 First fitting part
12 Second fitting part
13 Clasping ring
16 Gear wheel
17 Toothed ring
19 Collar
19b Flange
19e Free end
19f Supporting surface
19g Groove
19i Inner surface
21 Driver
22 Hub
23 Bore
25 Covering disk
27 Wedge segment
28 Plain bearing bushing
29 Driver segment
35 Spring
35a End finger
43 Securing ring
44 Sealing ring
45 Separating ring
51 Blocking spring
55 Toothing
A Axis
w Bead
$W_1$ First tool
$W_2$ Second tool
$W_3$ Third tool
$W_4$ Fourth tool

The invention claimed is:

1. A fitting for a vehicle seat, comprising:
a first fitting part and a second fitting part, which are rotatable relative to each other and which are in geared connection with each other by a toothed ring and a gear wheel meshing with the toothed ring; and
an eccentric which is driven by a driver, that revolves in the circumferential direction and is intended for driving a relative rolling movement of the gear wheel and the toothed ring, wherein at least one of the driver is mounted with play in a collar of the second fitting part and the eccentric is mounted on the collar of the second fitting part, and wherein a free end of the collar has a flange, an end side of which forms an axial supporting surface for the driver,
wherein the flange has a groove in the supporting surface.

2. The fitting as claimed in claim 1, wherein the flange is deformed material on the free end of the collar.

3. The fitting as claimed in claim 2, wherein the flange is at least partially radially displaced material.

4. The fitting as claimed in claim 3, wherein the groove is an impression of a bead of a tool.

5. The fitting as claimed in claim 1, wherein at least sections of the groove run in the circumferential direction.

6. The fitting as claimed in claim 5, wherein the groove is formed in a continuously encircling manner and equidistantly from the inner edge of the supporting surface.

7. The fitting as claimed in claim 5, wherein the groove is placed in the supporting surface closer to the inner edge than to the outer edge of the supporting surface.

8. The fitting as claimed in claim 1, wherein the groove has a depth of 0.5mm +/−0.2 mm.

9. The fitting as claimed in claim 1, wherein the supporting surface has an outside diameter of 21 mm +/−1 mm and an inside diameter of 13 mm +/−1 mm.

10. The fitting as claimed in claim 9, wherein the groove in the form of at least partially encircling groove runs on a circle with a diameter of 16 mm +/−1 mm.

11. The fitting as claimed in claim 1, wherein the supporting surface of the collar extends radially inward over a cylindrical inner surface of the collar.

12. A vehicle seat, comprising:
   at least one fitting as claimed in claim 1;
   a seat part which is connected to one of the two fitting parts; and
   a backrest which is connected to the other of the two fitting parts.

13. A method for producing a fitting for a vehicle seat having a first fitting part and a second fitting part, which are rotatable relative to each other and which are in geared connection with each other by a toothed ring and a gear wheel meshing with the toothed ring; and an eccentric which is driven by a driver, that revolves in the circumferential direction and is intended for driving a relative rolling movement of the gear wheel and the toothed ring, wherein at least one of the driver is mounted with play in a collar of the second fitting part and the eccentric is mounted on the collar of the second fitting part, and wherein a free end of the collar has a flange, an end side of which forms an axial supporting surface for the driver, wherein the flange has a groove in the supporting surface, the method comprising:
   drawing the collar; and
   subsequent to the drawing step, at least partially displacing radially material of the free end of the collar by a tool in order to form the flange with the supporting surface.

14. The method as claimed in claim 13, wherein the tool has a bead which at least partially radially displaces the material of the free end of the collar.

15. The method as claimed in claim 14, wherein the bead forms a groove in the supporting surface.

* * * * *